United States Patent [19]

Matijevic et al.

[11] Patent Number: 5,248,556
[45] Date of Patent: Sep. 28, 1993

[54] SYSTHETIC WHITENER PIGMENT

[75] Inventors: Egon Matijevic; Peter Hsu, both of Potsdam, N.Y.; Manfred R. Kuehnle, Waldesruh, P.O. Box 1020, Rte. 103A, New London, N.H. 03257

[73] Assignee: Manfred R. Kuehnle, New London, N.H.

[21] Appl. No.: 792,791

[22] Filed: Nov. 15, 1991

[51] Int. Cl.$^5$ .......................... B32B 5/16; B32B 15/02
[52] U.S. Cl. .................................. 428/403; 106/442; 106/481; 106/482; 106/492; 428/404; 428/406
[58] Field of Search ...................... 428/404, 406, 403; 106/442, 481, 482, 492

[56] References Cited

U.S. PATENT DOCUMENTS

| 3,718,494 | 2/1973 | Jacobson | 106/442 |
| 3,941,603 | 3/1976 | Schmidt | 106/442 |
| 4,192,691 | 3/1980 | Armanini | 428/404 |
| 4,197,135 | 4/1980 | Bailey et al. | 106/23 |
| 4,210,916 | 7/1980 | Mansukhani | 346/1.1 |
| 4,565,581 | 1/1986 | Bernhard | 428/404 |
| 4,566,908 | 1/1986 | Nakatani et al. | 106/308 |
| 4,615,940 | 10/1986 | Panush et al. | 428/404 |
| 4,689,078 | 8/1987 | Koike et al. | 106/22 |
| 4,705,567 | 11/1987 | Hair et al. | 106/20 |
| 4,851,293 | 7/1989 | Egerton et al. | 428/404 |
| 4,877,451 | 10/1989 | Winnik et al. | 106/23 |
| 4,880,432 | 11/1989 | Egan et al. | 8/647 |

FOREIGN PATENT DOCUMENTS 1057653 3/1986 Japan .................................. 428/404

OTHER PUBLICATIONS

Tentorio, Matijevic & Kratohvil, 26 *J. Colloid Interface Sci.*, vol. 77, No. 2 (1980).
Gutoff & Swank, 76 *AIChE Symposium Series* 43 (1980).
Stöber, Fink & Bohn, 26 *J. Colloid Interface Sci.* 62 (1968).
Aiken, Hsu & Matijevic, 71 *J. Am. Ceram. Soc.* 845 (1988).
Allingham, Cullen, Giles, Jain & Woods, 8 *J. App. Chem.* 108 (1958).
Toon & Ackerman, 20 *Appl. Optics* 3657 (1981).
Van Helden, Jansen & Vrij, 81 *J. Colloid and Interface Sci.* 354 (1982).

*Primary Examiner*—Paul J. Thibodeau
*Assistant Examiner*—D. S. Nakarani
*Attorney, Agent, or Firm*—Cesari and McKenna

[57] ABSTRACT

Whitener pigment particles that offer good hiding power consist of particles having a uniform shape (preferably spherical) and varying only slightly in dimension. The particles consist of an inexpensive, readily manufacturable core material which is surrounded by one or more thin, concentric layers or shells, one of which is titania. The core provides the central mechanical support for the shells. In addition to the titania shell, layers can be added to provide compatibility with the carrier in which the particles are dispersed and promote phase transformation. Also described is a production method and apparatus for generating large quantities of the particles.

10 Claims, 7 Drawing Sheets 0.5 μm 0.5 μm

2μm

2μm

1μm

1μm 0.5μm 0.5μm

SYSTHETIC WHITENER PIGMENT

BACKGROUND OF THE INVENTION

A. Field of the Invention

This invention relates generally to whiteners, and more particularly to improved whitener pigment materials for use in papermaking and other applications, as well as methods and apparatus for making these materials.

B. Description of the Related Art

Whitener pigments are employed in a diverse variety of industrial, business and decorative environments to produce a "white" visual impression. Such pigments may be mixed with suitable carrier materials to create, for example, white paper, plastic or paint. Whiteners produce their characteristic visual appearance by reflecting and scattering most visible frequencies of incident daylight radiation.

One popular whitener pigment is titanium dioxide, commonly referred to as "titania", $TiO_2$. Crystals of this compound, particularly those having a rutile crystal structure, exhibit a high index of refraction and are largely inert chemically.

The performance of a particular pigment, as measured by the degree of apparent whiteness conferred by a given particle concentration, is often limited by the particles' physical characteristics. For example, irregularities in particle shape and size can reduce the opacity (or covering power) of the resulting whitener composite. For a given refractive index, there is an optimum size to achieve the maximum opacity. In the case of spherical particles of rutile titania, the optimum size is 0.2 to 0.3 $\mu m$ in diameter.

Unfortunately, it is difficult to control the morphologies of typical whitener-pigment crystals. Conventional production methods generate particles having different shapes and a range of sizes, with concomitantly limited performance attributes.

DESCRIPTION OF THE INVENTION

Brief Summary of the Invention

The whitener pigment particles of the present invention achieve the following objectives:

a. To furnish a spherical core particle having a predetermined, optimum size (based on theoretical calculations), which is suitable for supporting external shells of materials that provide desirable optical and surface properties;

b. To surround the core particle with a uniform hydrous titania shell having a predetermined thickness;

c. To treat the surface of the core particle, prior to coating with hydrous titania, to enhance its coatability with the hydrous titania shell; and d. To add small quantities of substances to the titania shell to serve as a sealer and reduce any microporosity, to aid with dispersion, and to act as a retention-aid for papermaking.

More generally, each particle consists of an inexpensive, readily manufacturable core material surrounded by one or more thin, concentric layers or shells, one of which is a whitener substance (preferably titanium dioxide, also known as titania). The core provides the central mechanical support for the shells. In addition to the whitener layer, shells can be added to provide compatibility with the carrier in which the particles are to be dispersed, thereby facilitating formation of a cooperative, heterogeneous matrix.

Suitable core materials are obtainable as particles of uniform shape, preferably as microspheres, having a relatively narrow size distribution. For purposes of the present invention, average diameters ranging from about 0.7 $\mu m$ to 1.0 $\mu m$ are optimal for our preferred core material, uniform spherical silica ($SiO_2$), synthesized by hydrolysis of tetraethylorthosilicate in a mixture of alcohol, water and ammonia. Other synthetic inorganic sols (e.g., $ZnO$, $Al_2O_3$, $ZrO_2$, etc.), thermosetting lattices, and other commercial powders (e.g. quartz, alumina, etc.) can also be used advantageously.

We have employed a variety of alternative core materials having convenient optical properties, including Min-u-sil quartz (marketed by Truesdale Company, Bington, Mass.) and borosilicate glass (such as that sold by Potters Industries, Carlstadt, N.J.). The surfaces of these core particles are treated to enhance compatibility with hydrous titania, which is applied as a second layer. The composite particles are then calcined to convert this layer to titanium dioxide, which provides the whitening function. The titania-coated particles can also be provided with still another, outermost shell layer to improve performance in various special applications. For example, the final layer can reduce the microporosity of the titania shell, modify the surface charge, increase dispersibility of the powdered whitener in different media, and/or improve retention properties for papermaking.

We also describe a suitable process-flow and production system for manufacturing the above-described pigments on a continuous basis.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE INVENTION

1. Synthesis of Particle Cores

As suggested above, the primary requirement of a suitable core material is its ability to intimately interact (either directly or via an intermediate layer) with a layer of another material possessing a high refractive index in order to produce a strong covering (hiding) power.

As stated earlier, our preferred core material is silica, consisting of uniform spherical particles having a desired average diameter (0.7-1.0 μm). We obtained such silica particles by hydrolysis of tetraethylorthosilicate (TEOS) in an alcohol/water/ammonia mixture, using a novel modification of the procedure originally reported by Stöber, Fink, and Bohn (26 *J. Colloid Interface Sci.* 62 [1968]). Particle size is strongly influenced by the concentration of the reactants, by temperature, and to a smaller extent by the molecular weight of the alcohol solvent. Furthermore, particle size can be increased through the use of seeded-growth techniques, which also promote higher particle yields (see, e.g., Van Helden et al., 81 *J. Colloid Interface Sci.* 354 [1981]).

Alternatively, commercial quartz or glass of suitable dimension can also be used as core material.

2. Preparation of Spherical Silica Core Particles

Monodispersed silica particles of various sizes can be obtained by hydrolysis of TEOS in a solvent consisting of alcohol, water and ammonia ($NH_4OH$) according to the reactions:

$$Si(OEt)_4 + 4H_2O \rightarrow Si(OH)_4 + 4EtOH$$

$$Si(OH)_4 \rightarrow SiO_2 + 2H_2O$$

In the general procedure for the preparation of spherical silica particles, selected amounts of TEOS, water, and ammonia are mixed with the solvent (e.g., alcohol) and brought to 40° C. The resulting particle size depends on the reactant concentrations and the time of aging. The reaction can be arrested by rapid cooling of the entire system. To produce larger particles, it is necessary to use a two-stage procedure in which additional amounts of TEOS are added to the dispersion of silica particles that have already been produced.

EXAMPLE 2.1

Monodispersed silica particles having diameters ranging from 0.6 to 0.8 μm are obtained by mixing 150 cm$^3$ TEOS, 10 cm$^3$ of a 30 wt % solution of $NH_4OH$, and 750 cm$^3$ of "recycled solvent" (described below) aged at 40° C. for 1 hr. The TEOS is added in three 50-cm$^3$ aliquots at 5-7 min intervals.

Figure 1:
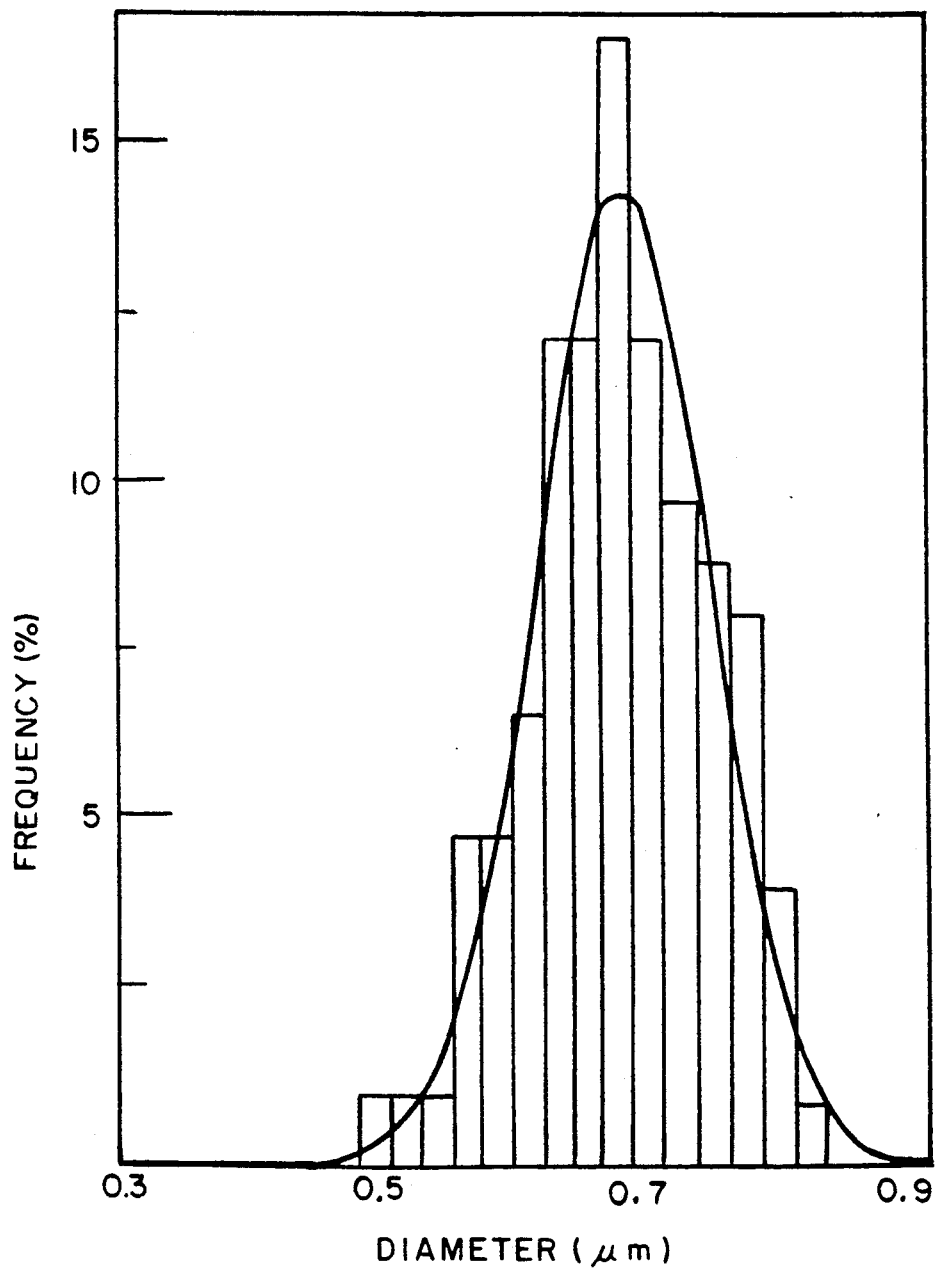
FIG. 1 shows the size distribution of silica particle cores obtained from five successive batch runs, each run other than the first carried out in solvent recycled from the previous run.

The "recycled solvent" is obtained by distillation of a diluted silica dispersion. For example, we combined 60 cm$^3$ TEOS, 20 cm$^3$ $NH_4OH$, 10 cm$^3$ $H_2O$, and 630 cm$^3$ isopropanol, and aged this mixture at 40° C. for one hour. We then diluted the resulting silica dispersion 1:1 with distilled water, and distilled the mixture at 80°-90° C. to recover what we term "recycled solvent." This solvent can be used in the manner described above to produce silica particles, and then used again; this process of iterative solvent reuse can continue through several cycles. Although the composition of the recycled solvent (which includes ethanol from TEOS hydrolysis, isopropanol, water, and ammonia) varies in different batch runs as ethanol accumulates, we have found that the silica particles remain largely within the aforementioned size range through several recycling runs. This is illustrated in FIG. 1, which show the size distribution of particles obtained from five successive batch runs, each run other than the first carried out in solvent recycled from the previous run as discussed above.

This procedure allows not only recovery and reuse of liquid reaction components, but also use of larger amounts of TEOS without increase in reaction times.

TABLE I

Particle Diameter (μm) of Silica Obtained by Aging at 40° C. for 1 hr Solutions of Reactants at Given Concentrations (mol dm$^{-3}$) and Volumes (cm$^3$)

Figure 2A:
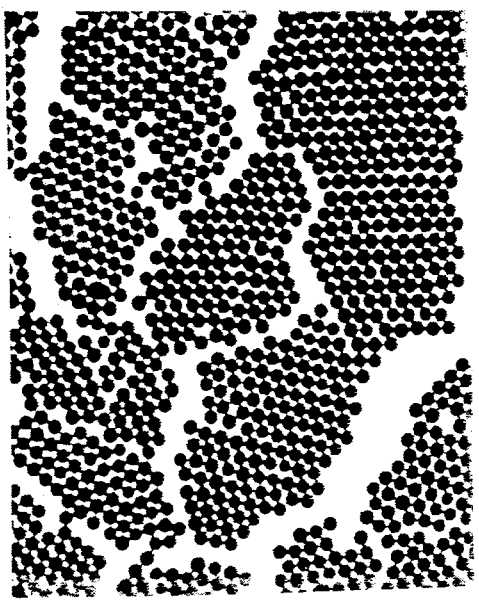
FIGS. 2A, 2B, 2C, and 2D each illustrate a transmission electron micrograph depicting silica particle cores synthesized according to the present formulations.
Figure 2B:
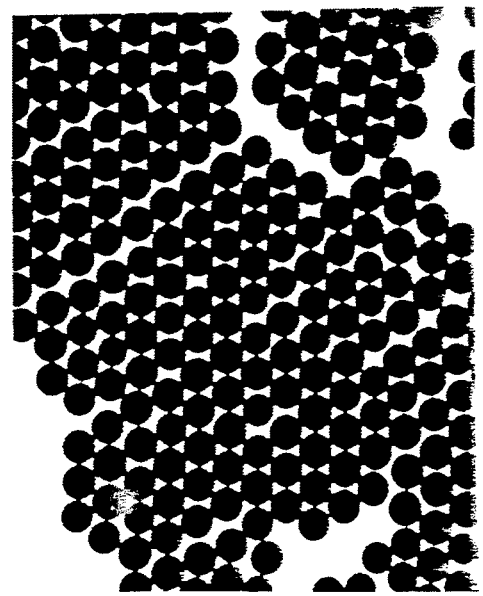
Figure 2C:
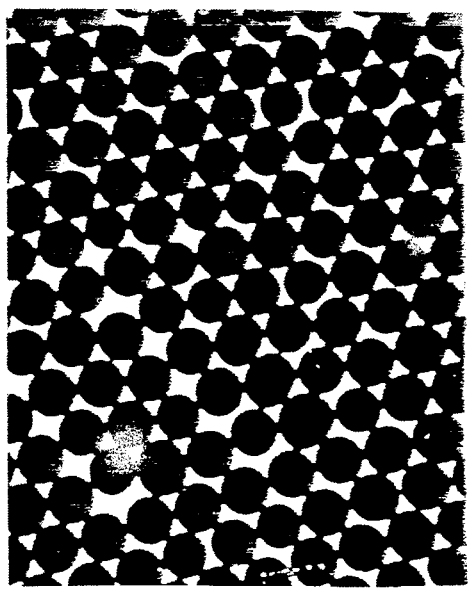
Figure 2D:
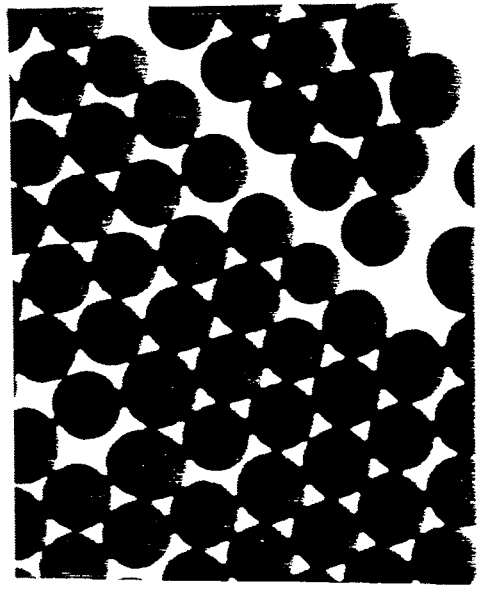

| Example | 2.2 | 2.3 | 2.4 | 2.5 | 2.6 | 2.7 | 2.8 |
|---|---|---|---|---|---|---|---|
| Particle Diameter (μm) | 0.22 | 0.32 | 0.46 | 0.68 | 0.78 | 1.0* | 1.2* |
| TEOS (mol dm$^{-3}$) | 0.20 | 0.25 | 0.30 | 0.35 | 0.45 | 0.45 + 0.45 | 0.5 + 0.5 |
| $NH_3$ (mol dm$^{-3}$) | 0.79 | 0.90 | 1.13 | 1.16 | 1.16 | 2.0 | 2.0 |
| $H_2O$ (mol dm$^{-3}$) | 14.4 | 8.0 | 6.4 | 3.1 | 3.1 | 5.0 | 5.0 |
| Alcohol (cm$^3$) | 330** | 383** | 390** | 400*** | 390*** | 130*** | 120*** |
| Total Volume (cm$^3$) | 500 | 500 | 500 | 500 | 500 | 200 | 200 |
| FIG. | FIG. 2A | — | FIG. 2B | — | FIG. 2C | — | FIG. 2D |

*Indicates a two-step addition of TEOS, as described in the text
**Ethanol
***Isopropanol

EXAMPLES 2.2-2.8

Table I lists additional examples for the preparation of uniform spherical silica particles of different diameters, and demonstrates that different sizes of core particles can be obtained by the adjustment of reactant concentrations.

Systems designated by a single asterisk (i.e., Examples 2.7 and 2.8) refer to particles sufficiently large (>0.8 μm in diameter) as to require addition of TEOS in two subsequent stages in quantities shown in Table I.

Alcohol volumes followed by two asterisks indicate the use of ethanol, while those followed by three asterisks indicate the use of isopropanol.

FIGS. 2A, 2B, 2C, and 2D illustrate transmission electron micrographs depicting particle cores synthesized according to the conditions shown in Table I for Examples 2.2, 2.4, 2.6, and 2.8 respectively. It is apparent from these illustrations that each synthesis produces uniformly sized particles whose dimensions differ from those of particles produces using different reaction conditions.

3. Purification of Silica Particles

To purify silica particles, the dispersions as obtained are diluted 1:1 with distilled water, and distilled at 80°–90° C. to recover the solvent, as described above, or at least the alcohol portion thereof. After distillation, the concentrated silica dispersion is diluted with water and then extensively washed with distilled water. The purified dispersion has a pH of approximately 9 due to the presence of residual ammonia. If desired, a small amount of $HNO_3$ can be added to lower the pH to about 8 for surface modifications.

These purified silica particles can be stored either as an aqueous dispersion or as a powder, and recovered by different techniques (sedimentation, centrifugation, filtration, or spray drying). The solids are then dried in a vacuum desiccator at room temperature, and the resulting powder can be redispersed in water for further processing.

4. Surface Treatment of Core Particles

The core particles (either silica prepared as described above or commercially available microsize powders, such as Min-u-sil or borosilicate glass) can be treated to form a first layer or shell that improves the compatibility of the core particles with the whitener substance (described below), or acts to improve the quality of the whitener substance, or both. For example, coating the particles with a thin layer of aluminum hydrous oxide or aluminum silicate provides bonding affinity for titanium whitener compounds. It is especially preferred to include a coating of magnesium fluoride or tin oxide, because these materials promote the phase transformation of $TiO_2$ (anatase) to $TiO_2$ (rutile) during the calcination process described below, which in turn improves the hiding power of the whitener. Magnesium fluoride is especially preferred for this purpose because its crystal lattice structure matches that of $TiO_2$ (rutile), enabling a coating of magnesium to promote $TiO_2$ transformation during calcination as would a seed crystal.

EXAMPLE 4.1

1000 $cm^3$ of a dispersion containing 10 g of core particles and having a pH of approximately 8 was heated to 85° C. To this mixture were added 50 $cm^3$ of a coating solution consisting of 40 $cm^3$ of 8 mol $dm^{-3}$ urea, 6 $cm^3$ of 0.2 mol $dm^{-3}$ potash alum $[KAl(SO_4)_2]$ and 4 $cm^3$ of 0.2 mol $dm^{-3}$ $Al(NO_3)_3$; these ingredients were added slowly, at the rate of about 3 $cm^3$/min, and the mixture aged for an additional 40 min. This procedure yielded a surface coating of aluminum hydrous oxide on the silica particles amounting to about 2 wt % relative to the weight of the core particles. The amount of coating can be varied from 0.5 wt % to 3 wt % relative to the weight of the cores by controlling the amount and concentration of the coating solution.

EXAMPLE 4.2

1000 $cm^3$ of a dispersion containing 10 g of silica particles and having a pH of approximately 8 was heated to 85° C. To this mixture 6 $cm^3$ of a solution of 0.5 mol $dm^{-3}$ $MgCl_2$ were added, followed by slow addition of 60 $cm^3$ of a solution of 0.1 mol $dm^{-3}$ NaF. The system was aged at 85° C. for 30 mins. This procedure yielded a surface coating of $MgF_2$ on core particles amounting to about ; wt % relative to the weight of cores.

5. Addition of Whitener Layer

The surface-treated core particles can now be coated with a whitener substance. Our preferred whitener material, to which the ensuing examples relate, is titania. The degree of "hiding power" or opacity of the finished whitener particles depends on the size of the particles, their shape, the refractive index of the particles relative to that of the carrier medium, and the packing density of the particles. Since the pigment particles of the present invention are coated, the optimum scattering coefficient also depends the thickness and uniformity of the titania shell and the refractive indices of the core and shell materials. Adjusting these parameters to achieve optimal opacity is well within the purview of those skilled in the art. For this purpose, we have used the theory of light scattering by concentric spheres (see, e.g., Toon & Ackerman, 20 *Appl. Optics* 3657 [1981]; M. Kerker, in *The Scattering of Light and Other Electromagnetic Radiation* [1969], p. 351) to calculate the scattering coefficients for maximum opacity.

In our preferred embodiment, the whitener coating is added to prepared particles by hydrolysis and precipitation of titanyl sulfate $[TiOSO_4]$ to form a layer of titanium hydrous oxide, which is subsequently calcined to form titanium dioxide. A stock solution of 0.2 mol $dm^{-3}$ $TiOSO_4$ is first prepared and filtered through a membrane having a pore size of 0.2 $\mu$m. This solution is added, according to the proportions and conditions described in the following examples, to an aqueous dispersion of cores contained in a propylene bottle. The uniformity of the coating is affected by the initial and final pH values of the dispersion, the concentration and surface treatment of the core powder, the rate of addition of $TiOSO_4$ stock solution, the degree of stirring, and the reaction volume.

EXAMPLE 5.1

A 0.02 mol $dm^{-3}$ stock solution of $TiOSO_4$ (210 $cm^3$) was rapidly mixed with 500 $cm^3$ of a dispersion containing 10 g of core particles, and the system was then aged at 90° C. for one hour under gentle stirring. This procedure resulted in tiny gel-like particles of titanium hydrous oxide approximately 1 nm in diameter, which form a layer on the core particles and also collect into separate aggregates.

EXAMPLE 5.2

The procedure described in Example 5.1 was modified by changing the rate of addition of $TiOSO_4$ to 4 $cm^3$/min, and aging for an additional 30 min at 95° C. under gentle stirring. This procedure was found to improve the uniformity of the coated layer of titanium hydrous oxide.

EXAMPLE 5.3

In our preferred procedure, the method described in Example 5.2 is further modified to a two-step sequence, which facilitates deposit of coatings in excess of 30 wt % of total particle mass. To prepare particles having a titanium hydrous oxide coating of 30 wt %, we added half the total amount of $TiOSO_4$ stock solution (105 $cm^3$) to 500 $cm^3$ of a dispersion containing 10 g of silica particles, following the slow-addition technique described in Example 5.2. We then heated the system for 20 min at 95° C., and separated the resulting particles by sedimentation. These particles were redispersed in 500 $cm^3$ distilled water, and the remaining $TiOSO_4$ solution slowly added thereto under gentle stirring. The system was then aged for 30 min at 95° C., and the coated particles retrieved from the mixture as described below. The foregoing technique produces desirable particle characteristics due to maintenance of relatively low ionic strengths during the reaction, which retard particle aggregation and promotes formation of a uniform coating.

6. Recovery of Coated Particles

To recover the coated particles from the reaction mixture, the particles are first collected on a filter having a pore size of 0.45 μm by straining through the filter. While still on the filter, the collected particles are repeatedly washed with distilled water until the supernatant solution reaches pH 4–5. The particles are then redispersed in water with the addition of a dilute (0.0001 mol dm$^{-3}$) solution of NaOH. After filtration and repeated washings on the filter with about 500 cm$^3$ water, the particles are dried, preferably with a drying-aid agent or by spray drying.

7. Particle Calcination

Particles coated with titanium hydrous oxide are calcined to transform the coating into titanium dioxide with the evolution of water vapor. We calcined some coated particles at 800° C. and some at 1000° C. for one hour. X-ray diffraction analysis of both samples indicate that the particles calcined at 800° C. consist only of the anatase crystalline form, while those calcined at 1000° C. contain both anatase and rutile forms.

The fraction of the rutile form in the coated layer can be substantially increased by the above-described inner coating of $MgF_2$ and by constant agitation during the calcination process. Agitation can be provided by different means including mechanical shaking or use of a rotary kiln. The combination of the $MgF_2$ treatment and agitation for 30 min at 1000° C. yielded up to 95% transformation of anatase to rutile.

Figure 3A:
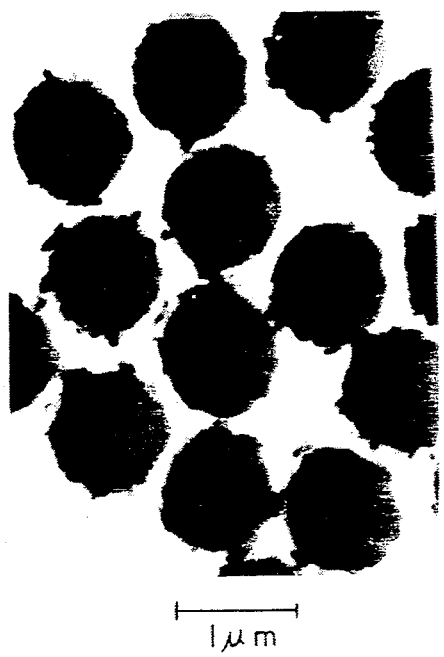
FIGS. 3A, 3B, 3C, and 3D are transmission electron micrographs of calcined whitener particles obtained from spherical silica cores coated according to Examples 5.1 (FIG. 3A), 5.2 (FIG. 3B), and 5.3 (FIGS. 3C AND 3D)
Figure 3B:
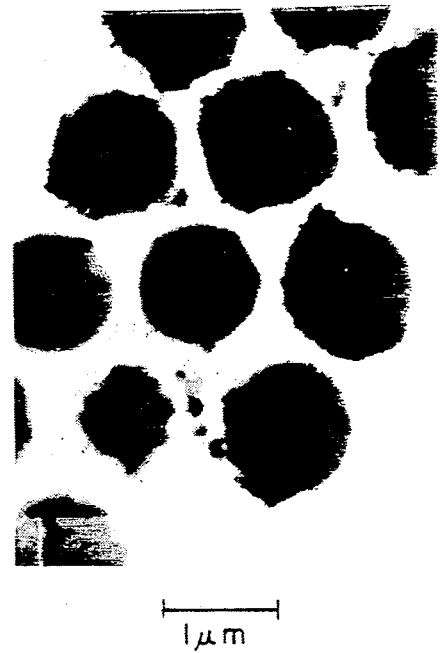
Figure 3C:
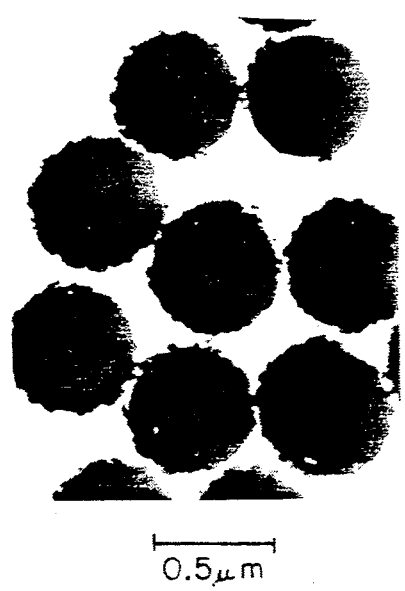
Figure 3D:
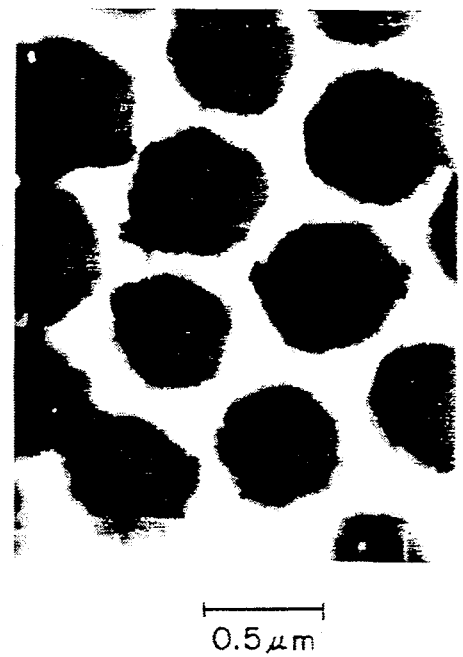

FIGS. 3A, 3B, 3C and 3D are transmission electron micrographs of calcined powders obtained with silica cores coated according Examples 5.1, 5.2, and 5.3, respectively (FIGS. 3C and 3D both illustrating Example 4.3 particles). These figures reflect a relatively even distribution of uniform, spherical particles; these characteristics promote good hiding power.

Figure 4A:
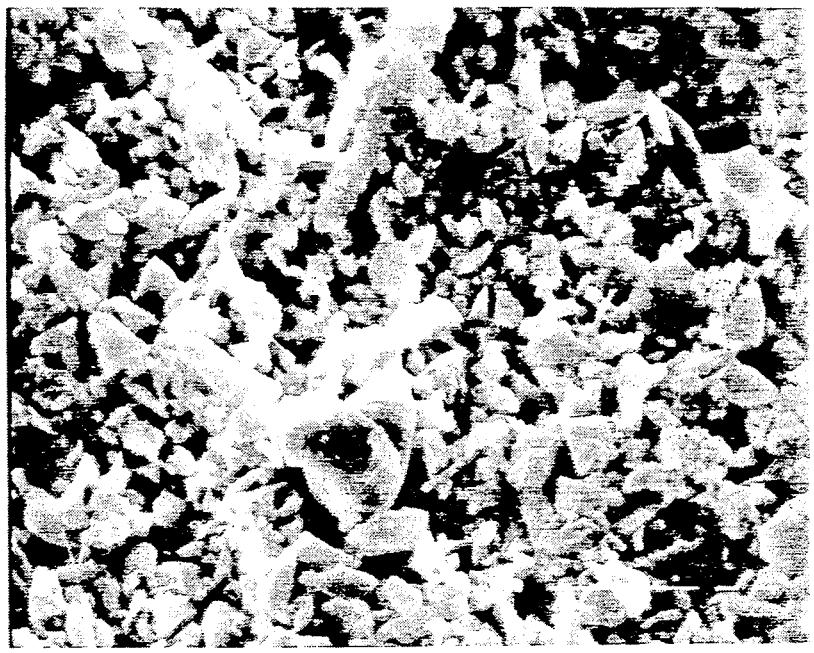
FIGS. 4A and 4B are scanning electron micrographs of the original Min-u-sil cores and the corresponding titania-coated particles, respectively.
Figure 4B:
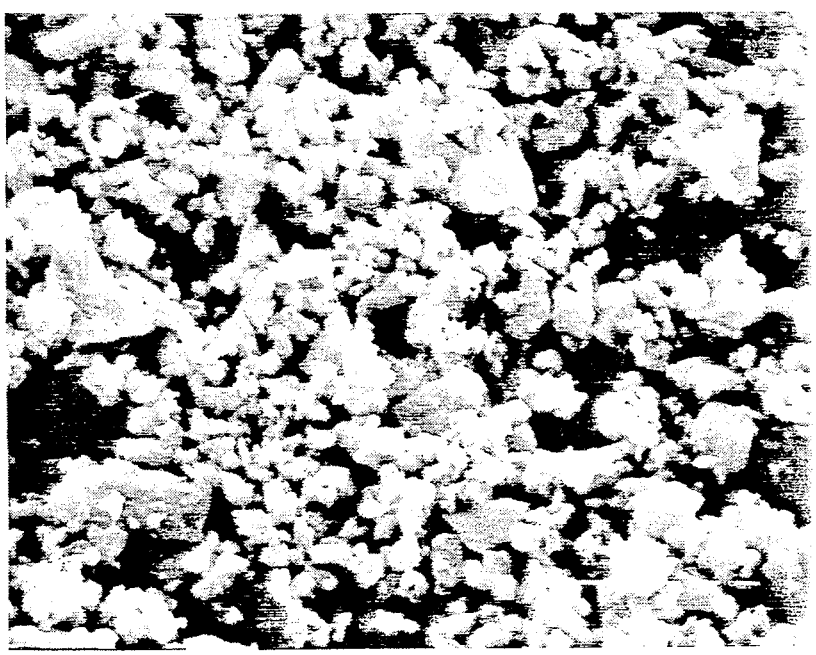

FIGS. 4A and 4B are scanning electron micrographs of the original Min-u-sil aerosol and the corresponding calcined titania-coated particles. It is noteworthy that the titania coatings smooth out, in part, the surface roughness of Min-u-sil cores.

8. Additional Coatings

It is possible to add still another coating shell to optimize properties such as dispersibility, retention within paper pulp, or to seal microcapillaries on the particle surfaces. For example, three such suitable coating materials are calcium molybdate [$CaMoO_4$] and calcium tungstate [$CaWO_4$], and aluminum silicate. It is also possible to add a final coating of aluminum oxide [$Al_2O_3$] to protect the titania against chemical reactions in hot resins such as melamine.

EXAMPLE 8.1

To obtain a coating of $CaMoO_4$ on particles prepared according to the foregoing examples, one first heats 1000 cm$^3$ of an aqueous dispersion containing 10 g of coated particles to 85° C. To this mixture is added 20 cm$^3$ of a 0.02 mol dm$^{-3}$ solution of $CaCl_2$, followed by addition of 20 cm$^3$ of a 0.02 mol dm$^{-3}$ solution of $Na_2MoO_4$. The system is then aged at 85° C. for 30 min. This procedure yields a surface coating of $CaMoO_4$ on the silica particles amounting to about 0.3 wt % relative to the weight of silica. By varying reactant concentrations, it is possible to obtain $CaMoO_4$ coatings between 0.1 and 0.5 wt % relative to the weight of the whitener.

EXAMPLE 8.2

To obtain a coating of $CaWO_4$ on particles prepared according to the foregoing examples, one first heats 1000 cm$^3$ of an aqueous dispersion containing 10 g of coated particles to 85° C. To this mixture is added 20 cm$^3$ of a 0.02 mol dm$^{-3}$ solution of $CaCl_2$, followed by the addition of 20 cm$^3$ of a 0.02 mol dm$^{-3}$ solution of $Na_2WO_4$. The system is then aged at 85° C. for 30 min. This procedure yields a surface coating of $CaWO_4$ on the silica particles amounting to about 0.6 wt % relative to the weight of silica. By varying reactant concentrations, it is possible to obtain $CaWO_4$ coatings between 0.1 and 0.5 wt % relative to whitener.

EXAMPLE 8.3

To 1000 cm$^3$ of an aqueous dispersion containing 10 g of core (with a pH of about 8) heated to 85° C., 7 cm$^3$ of a solution of 0.2 mol dm$^{-3}$ $Al(NO_3)_3$ is admixed, then 40 cm$^3$ of a solution of 0.05 mol dm$^{-3}$ $Na_2SiO_3$ is slowly added, and the system is finally aged at 85° C. for another 30 min. This procedure yields about 2 wt % $Al_2(SiO_3)_3$ as the coating layer on the silica surface. By varying the reactant concentrations, the amount of the coating layer may range from 0.5 to 2.0 wt % on the whitener.

9. Optical and Retention Characteristics

We compared the opacities of the whiteners of the present invention with that of a commercial rutile whitener, RLP2 (distributed by Kronos, Hightstown, N.J.). To facilitate comparison, we prepared sample sets from different batch runs, each set consisting of 0.5 g of coated particles collected as a uniform layer on a white (99% reflectance) membrane and a similar quantity of particles collected as a uniform layer on a black (4% reflectance) membrane. A similar sample set was prepared from the RLP2 whitener. The coated layers were wetted with a 2:1 mixture of glycerol and water, and stored in a desiccator overnight to evaporate water. In total, eight sample sets were prepared; the first five were based on particles having core diameters of 1.0 μm and coatings of varying thicknesses (50, 40, 30, 20 and 7 wt %, respectively), and the next three based on particles having coatings of 40 wt % but different core diameters (1.3, 0.8 and 0.5 μm, respectively).

Figure 5A:
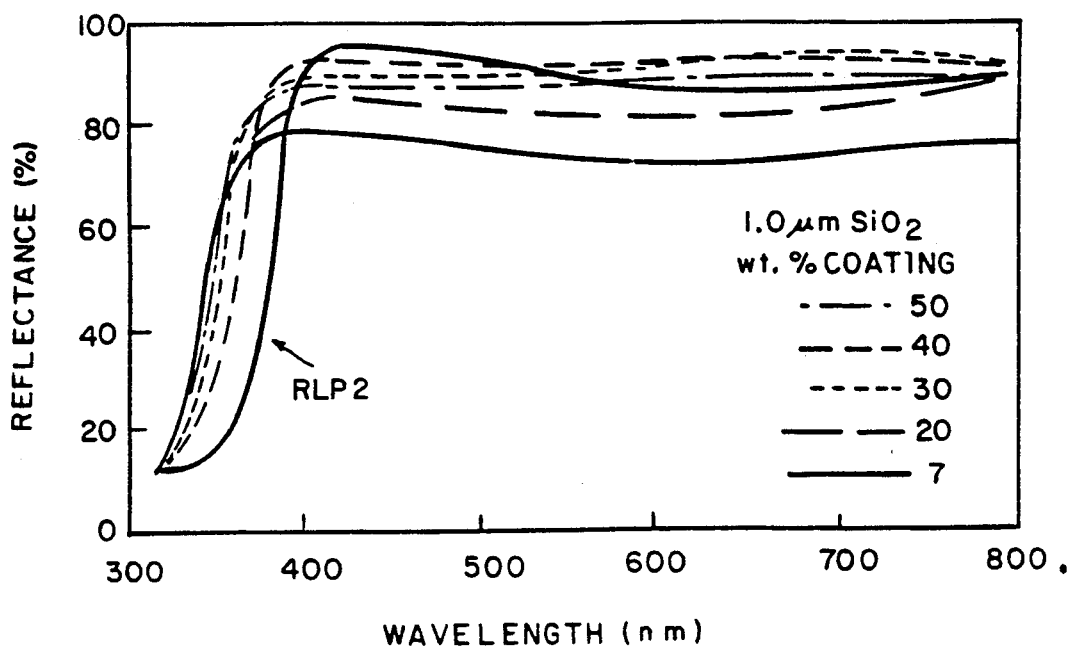
FIGS. 5A and 5B illustrate graphically reflectance spectra of spherical silica cores coated with different amounts of titania, and spherical silica particles of different sizes coated with the same amount (40 wt %) of titania, respectively.
Figure 5B:
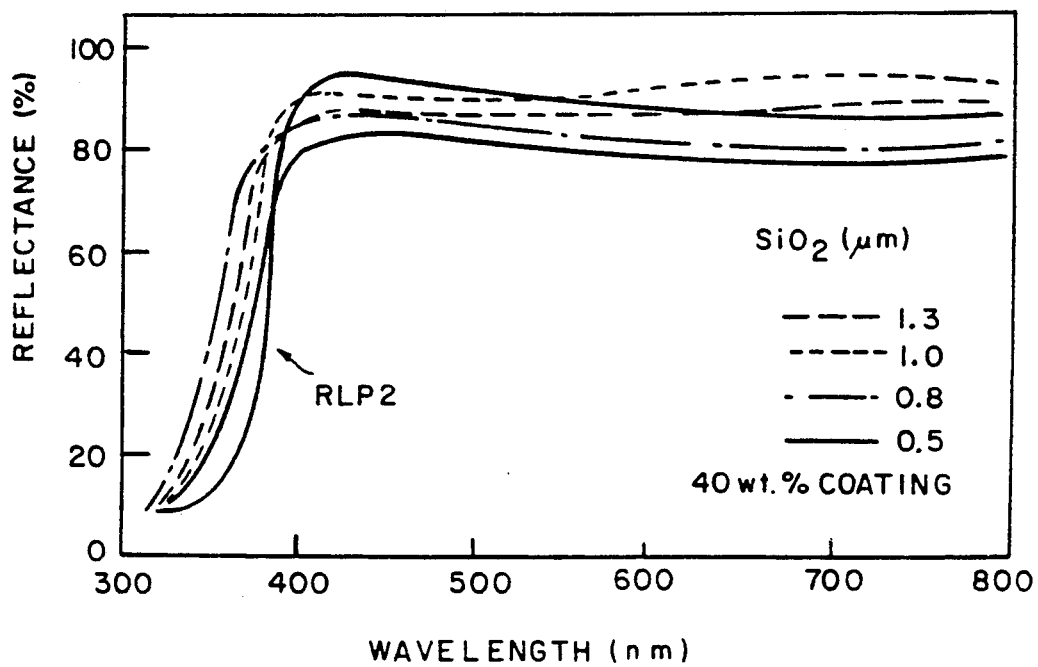

Opacity values for each of the samples were obtained by measuring the luminous reflectance, using a spectrophotometer equipped with an integrating sphere attachment, of each sample set over a range of incident wavelengths. The values of luminous reflectance (Y%) are calculated based on the reflectance spectra (380–800 nm wavelength) using the CIE Standard Colorimetric Systems for a light source C. The apparent opacities of the powders were then obtained by dividing the Y% of the white-backed particles by that of the black-backed particles. The results are shown as reflectance spectra, and indicate the optimum amount of titania coating to be about 40 wt % in FIG. 5 and the optimum core size to be about 1.0 μm in FIG. 5B. As shown in the spectra, the opacities of the coated-particle samples are similar to that of the RLP2.

The following Table II summarizes the opacity data for silica-core particles prepared under a variety of experimental conditions; the corresponding value for the commercial titania whitener RLP2 is 90%. The values in the table suggest that surface treatment with $MgF_2$ increases opacity for a given titania-coating thickness.

TABLE II

Summary of the Composition and the Corresponding Opacity of the Whiteners

| Sample | Core Diameter (μm) | Surface Treatment | Titania (wt %) | Top Coating | Calcination °C./min | Opacity (%) |
|---|---|---|---|---|---|---|
| | 0.4 | — | 30 | — | 1000/15 | 75 |
| | 0.6 | — | 30 | — | 1000/15 | 79 |
| | 0.7 | — | 30 | — | 1000/15 | 81 |
| | 0.7 | — | 30 | — | 1000/15 | 85 |
| | 0.7 | — | 30 | — | 1000/15 | 86 |
| | 0.7 | — | 30 | — | 1000/15 | 87 |
| ST45 | 0.7 | — | 40 | — | 1000/15 | 88 |
| | 1.0 | — | 20 | — | 1000/15 | 80 |
| | 1.0 | — | 10 | — | 1000/15 | 76 |
| | 1.0 | — | 30 | — | 1000/40 | 86 |
| | 1.0 | — | 30 | — | 850/60 | 85 |
| | 1.0 | — | 30 | — | 700/60 | 84 |
| | 1.0 | — | 30 | — | 500/60 | 82 |
| | 1.2 | — | 30 | — | 1000/15 | 88 |
| ST42 | 1.2 | — | 40 | — | 1000/15 | 91 |
| | 1.2 | — | 50 | — | 1000/15 | 90 |
| | 1.3 | — | 30 | — | 1000/15 | 87 |
| | 1.3 | — | 40 | — | 1000/15 | 89 |
| ST57N | 0.7 | $Al(OH)_3$ | 30 | — | 1000/15 | 85 |
| | 0.7 | $MgF_2$ | 30 | — | 1000/10 | 88 |
| ST69X | 0.7 | $MgF_2$ | 30 | — | 1000/15 | 89 |
| | 0.7 | $MgF_2$ | 30 | — | 1000/30 | 87 |
| | 0.7 | $MgF_2$ | 30 | — | 1000/60 | 87 |
| | 0.7 | $MgF_2$ | 30 | — | 1000/120 | 87 |
| ST69V | 0.7 | $SnO_2$ | 30 | — | 1000/15 | 88 |
| ST68M | 0.7 | $CaMoO_4$ | 30 | — | 1000/15 | 86 |
| ST68X | 0.7 | $CaWO_4$ | 30 | — | 1000/15 | 87 |
| ST70H | 0.7 | $MgF_2$ | 30 | $CaMoO_4$ | 1000/15 | 87 |
| ST70J | 0.7 | $MgF_2$ | 30 | $CaWO_4$ | 1000/15 | 88 |
| $X_wG$ | 0.7 | $MgF_2$ | 30 | — | 1000/30 Agitated | 92 |
| | 0.7 | $MgF_2$ | 30 | $CaMoO_4$ | 1000/30 Agitated | 90 |

The last two examples in Table II refer to samples which were agitated during the calcination process. Obviously, an improvement in the opacity is thereby achieved.

Figure 6A:
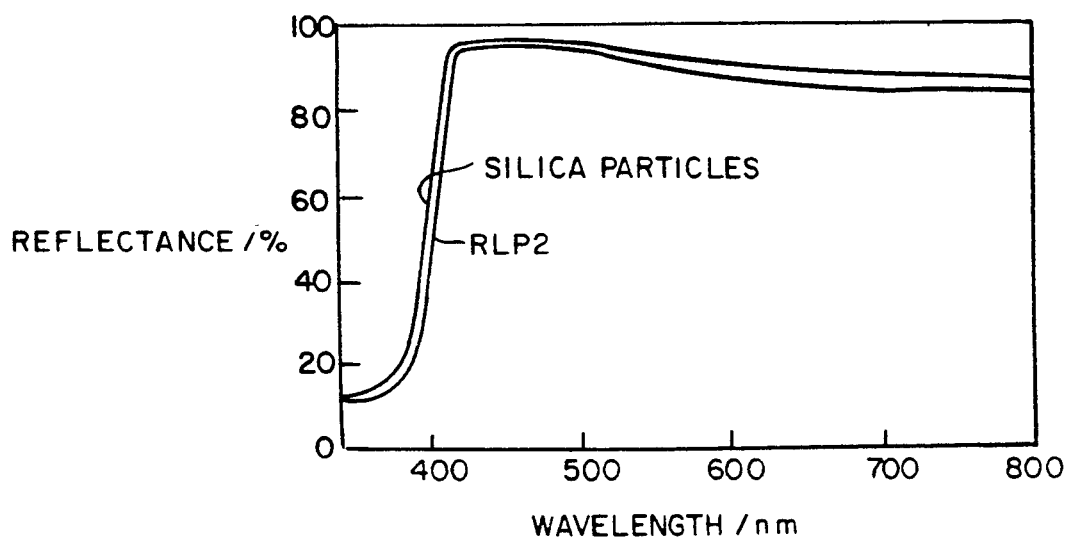
FIGS. 6A and 6B illustrate graphically reflectance spectra of silica and Min-u-sil particles (each coated with 30 wt % $TiO_2$) as compared with a commercial rutile whitener (RLP2)
Figure 6B:
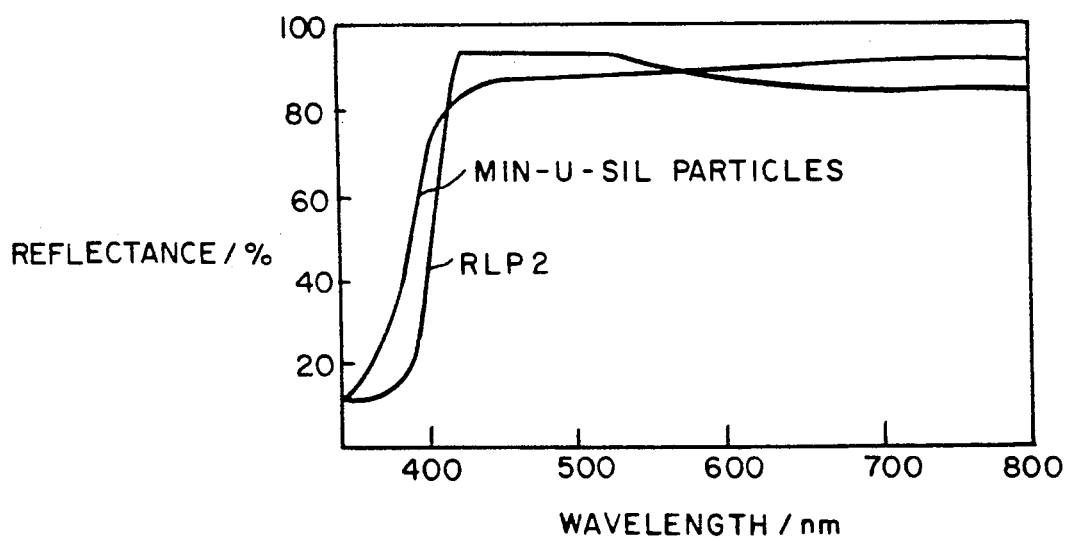

FIG. 6A demonstrates that the silica glass whitener (designated $X_wG$ in Table II) constantly exhibits about 2% higher reflectance than the commercial rutile RLP2 product. FIG. 6B compares the whitener using Min-u-sil cores with 30% titania coating calcined at 1000° C. for 30 min under agitation with the commercial RLP2 sample, and shows an improved reflectance at wavelengths above 550 nm.

We assessed the amount of titania that can be saved in the papermaking process using the particles of the present invention by preparing samples of two different particle batches mixed, in various proportions, with Avicel cellulose (manufactured by FMC Corporation, Philadelphia, Pa.). As shown in the following Table III, the opacities of these samples are similar to those of control samples prepared using similar amounts of RLP2. However, because of the reduced amount of titania necessary to produce our particles as compared with RLP2, the amount of titania saved during the production process can range from 45% to 70%.

TABLE III

The Opacity of Whiteners in the Avicel Cellulose Matrix

| Sample | Amount of the Whitener (g/m²) | Thickness of the Whitener-Cellulose Matrix (mm) | Opacity (%) | Saving in Titania* |
|---|---|---|---|---|
| In 44 gm² cellulose | | | | |
| RLP2 | 9 | 0.13 | 80 | |
| ST42 | 9 | 0.13 | 79 | 55% |
| ST45 | 9 | 0.13 | 77 | 45% |
| RLP2 | 26 | 0.13 | 84 | |
| ST42 | 26 | 0.15 | 87 | 70% |
| ST45 | 26 | 0.14 | 84 | 60% |
| RLP2 | 44 | 0.14 | 89 | |
| ST42 | 44 | 0.16 | 89 | 60% |
| ST45 | 44 | 0.15 | 87 | 50% |
| In 70 g/m² cellulose | | | | |
| RLP2 | 9 | 0.20 | 87 | |
| ST42 | 9 | 0.20 | 86 | 55% |
| ST45 | 9 | 0.20 | 83 | 45% |
| RLP2 | 26 | 0.21 | 91 | |
| ST42 | 26 | 0.22 | 92 | 65% |
| ST45 | 26 | 0.22 | 91 | 60% |
| RLP2 | 44 | 0.23 | 94 | |
| ST42 | 44 | 0.24 | 95 | 65% |
| ST45 | 44 | 0.24 | 92 | 50% |

*As compared to the RLP2 sample of approximately equal opacity.

To evaluate the retention properties of our whitener particles in paper pulp, we prepared a 200 cm³ suspension consisting of whitener particles, pulp (210 mg short fiber and 70 mg long fiber), a retention agent (Retaminol K), and aluminum alum by first combining these ingredients and mixing them in a kitchen blender at high speed for 5 min. The mixture was then pre-sedimented for 2 min, and subsequently filtered through a metal screen having 0.3 mm pores. The resulting paper (approximately 50 cm$^2$) was dried in a vacuum oven at 100° C. for two hours and evaluated for pigment retention.

The results of our evaluations, which included preparation of paper samples each containing particles from a different batch or RLP2 (for comparative purposes), are shown in the following Table IV.

TABLE IV

Retention Studies of Whiteners in Papermaking

| Sample | Retaminol (mg/dm$^3$) | Alum (μmol/dm$^3$) | Paper Wt (mg) | Ash Wt (mg) | Retention (wt %) |
|---|---|---|---|---|---|
| RLP2 | 30 | 150 | 535 | 76 | 76 |
| ST70M (CaMoO$_4$) | 30 | 150 | 552 | 81 | 81 |
| ST70L (SnO$_2$) | 30 | 150 | 580 | 75 | 75 |
| ST70H (MgF$_2$) | 30 | 150 | 525 | 82 | 82 |
| ST70J (MgF$_2$) | 30 | 150 | 552 | 80 | 80 |
| ST68X (CaMoO$_4$) | 30 | 150 | 483 | 70 | 78 |
| RLP2 | 20 | 150 | 516 | 73 | 73 |
| ST69V (SnO$_2$) | 20 | 150 | 478 | 76 | 76 |
| ST69X (mgF$_2$) | 20 | 150 | 490 | 75 | 75 |
| RLP2 | 10 | 75 | 290 | 66 | 66 |
| ST69V (SnO$_2$) | 10 | 75 | 314 | 64 | 64 |
| ST69X (MgF$_2$) | 10 | 75 | 324 | 80 | 80 |
| ST68W (CaWO$_4$) | 10 | 75 | 318 | 69 | 69 |
| ST57N (Al$_2$O$_3$) | 10 | 75 | 332 | 73 | 73 |
| ST69V (SnO$_2$) | 10 | 75 | 314 | 64 | 64 |
|  | 20 | 75 | 444 | 72 | 72 |
|  | 20 | 150 | 478 | 76 | 76 |
|  | 30 | 150 | 495 | 77 | 77 |
|  | 50 | 150 | 434 | 71 | 71 |
| Double filtration |  |  |  |  |  |
| RLP2 | 30 | 150 | 538 | 87 | 87 |
| Anatase | 30 | 150 | 545 | 92 | 92 |
| ST69V (SnO$_2$) | 30 | 150 | 514 | 90 | 90 |
| ST69X (MgF$_2$) | 30 | 150 | 534 | 88 | 88 |

Procedure: A 200 cm$^3$ suspension, consisting of whitener, pulp (210 mg short fiber and 70 mg long fiber), retention agent (Retaminol) and aluminum alum, was mixed by a kitchen blender at high speed setting for 5 min and then presedimented for 2 min before filtration through a metal screen (0.3 mm). The paper (50 cm$^2$) was dried in a vacuum oven at 100° C. for 2 hr.

The results indicate that the particles of the present invention are retained within the pulp matrix to a comparable or greater extent than RLP2 particles. We also found that retention can be increased by filtering the supernatant liquid of the pulp mixture through the newly formed paper matrix, as indicated under the heading "Double Filtration" in Table IV.

10. Production Process and Apparatus

Figure 7:
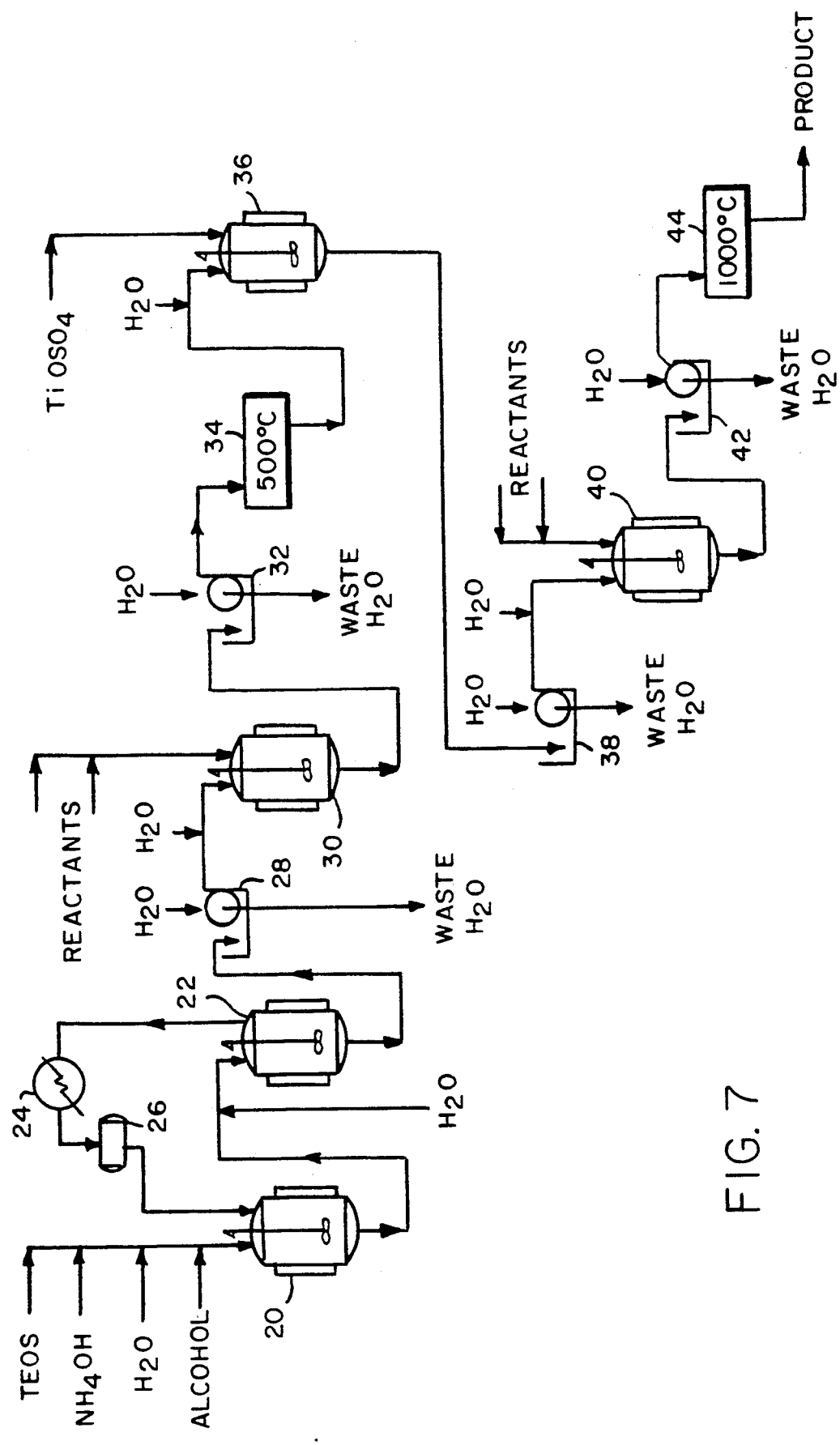
FIG. 7 illustrates schematically an apparatus for commercial production of the whitener particles of the present invention.

The above-described particles can be prepared on a production line containing equipment suitable for carrying out the necessary synthesis steps. A suitable array of equipment is depicted schematically in FIG. 7.

The reactants TEOS, NH$_4$OH, H$_2$O and alcohol are combined in a reactor 20 to form silica cores according to Example 2.1 or 2.2. Core particles are separated from the mixture and the solvent (or portions thereof) may be recovered for reuse in a distillation stripper 22, which returns solvent fractions to reactor 20 via a condenser 24 and a holding tank 26. Distilled water to dilute the silica dispersion may be introduced at the input to stripper 22.

After distillation, the concentrated silica dispersion is fed to a rotary filter 28, where it is continuously filtered and may be mixed with distilled water until the pH is lowered sufficiently to accommodate further processing. The recovered particles are now ready for surface treatment, which begins with introduction into a second reactor 30. At this point, the reactants enumerated in Example 4.1, 4.2 or 4.3 are added to reactor 30 as described in the respective examples.

The dispersion of particles are then transferred to a second rotary filter 32, where it is combined with water to flush out residual reactant material, and thereafter to a calciner 34 where the particles are heat-treated at an elevated temperature (preferably about 500° C.).

Following calcination, the surface-treated particles are introduced into a third reactor 36 for coating with a whitener substance, preferably titanium hydrous oxide. The particles are combined with TiOSO$_4$ and reacted according to the procedure of Example 5.1, 5.2 or 5.3 in reactor 36, and then washed and filtered in a third rotary filter 38 until the supernatant solution reaches pH 4-5.

If the pigment particles are to be provided with a further coating as described in Example 8.1 or 8.2, they are reacted in a third reactor 40 according to either example, filtered in a fourth rotary filter 42, and calcined in a second calciner 44 (preferably at 1000° C.). The finished particles are then ready for use.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A white pigment material comprising particles which themselves comprise:
   a. a substantially spherical, uniformly shaped core element;
   b. a first coating thereon selected from the group consisting of aluminum hydrous oxide, aluminum silicate, tin oxide and magnesium fluoride; and
   c. a substantially uniform second coating, surrounding the first coating, of titanium dioxide.

2. The pigment material of claim 1 further comprising a third coating overlying the titanium-dioxide coating, and which reduces any microporosity in the titanium-dioxide coating.

3. The pigment material of claim 1 wherein the titanium dioxide is obtained by calcining titanium hydrous oxide.

4. The pigment material of claim 1 wherein the dimensions of the core elements meet the mathematically optimum dimension for producing, in combination with the whitener coating, maximum hiding power.

5. The pigment material of claim 1 wherein the weight of titanium dioxide ranges from 20 to 40 wt % relative to the total particle.

6. The pigment material of claim 2 wherein the weight of the third coating ranges from 0.1 and 0.5 wt % relative to the weight of the titanium dioxide.

7. The pigment material of claim 6 wherein the third coating is selected from the group consisting of calcium molybdate and calcium tungstate.

8. The pigment material of claim 1 wherein the weight of the first coating ranges from 0.5 wt % to 3 wt % relative to the weight of the core.

9. The particles of claim 1 wherein the core element is composed of material selected from the group consisting of silica, synthetic inorganic sols and thermosetting lattices.

10. The particles of claim 9 wherein the core element is silica and ranges in size from 0.7 to 1.0 µm.

* * * * *